United States Patent
Bekircan et al.

(10) Patent No.: US 10,487,876 B2
(45) Date of Patent: Nov. 26, 2019

(54) RELIEF SLOT FOR A LOAD BEARING ASSEMBLY

(71) Applicant: Claverham Limited, Shirley, Solihull (GB)

(72) Inventors: Suat Bekircan, Bath (GB); Paul Brewer, Bristol (GB)

(73) Assignee: CLAVERHAM LIMITED, Bristol, Avon (GB)

( * ) Notice: Subject to any disclaimer, the term of this patent is extended or adjusted under 35 U.S.C. 154(b) by 0 days.

(21) Appl. No.: 15/473,982

(22) Filed: Mar. 30, 2017

(65) Prior Publication Data

US 2017/0356496 A1 Dec. 14, 2017

(30) Foreign Application Priority Data

Jun. 9, 2016 (EP) ..................................... 16173763

(51) Int. Cl.
| | | |
|---|---|---|
| *F16C 33/58* | (2006.01) | |
| *F16C 11/06* | (2006.01) | |
| *F16C 35/02* | (2006.01) | |
| *F16C 23/04* | (2006.01) | |
| *B23P 15/00* | (2006.01) | |
| *F16C 27/02* | (2006.01) | |

(52) U.S. Cl.
CPC .......... *F16C 33/583* (2013.01); *B23P 15/003* (2013.01); *F16C 11/0614* (2013.01); *F16C 23/045* (2013.01); *F16C 27/02* (2013.01); *F16C 35/02* (2013.01)

(58) Field of Classification Search
CPC ........ F16C 17/105; F16C 11/06; F16C 11/08; F16C 11/083; F16C 11/086; F16C 27/02; F16C 23/04; F16C 23/043; F16C 35/02; F16C 35/067; F16C 11/0604; F16C 11/0614; F16C 27/04; F16C 27/00; F16C 23/02; F16C 23/041; F16C 23/045; F16C 23/046; F16C 23/048; F16C 2226/52; B64C 13/30
See application file for complete search history.

(56) References Cited

U.S. PATENT DOCUMENTS

| | | | | | |
|---|---|---|---|---|---|
| 1,386,255 A | * | 8/1921 | Hindle | ................... | F16C 27/04 |
| | | | | | 29/898.063 |
| 1,593,251 A | * | 7/1926 | Flintermann | .......... | B61F 15/06 |
| | | | | | 384/302 |

(Continued)

FOREIGN PATENT DOCUMENTS

| | | |
|---|---|---|
| DE | 202005005762 U1 | 6/2005 |
| EP | 1806517 A1 | 7/2007 |
| FR | 2662475 A1 | 11/1991 |

OTHER PUBLICATIONS

Machine Translation of Didier FR 2662475 Nov. 1991.*
Extended European Search Report for International Application No. 16173763.0 dated Dec. 16, 2016, 6 pages.

*Primary Examiner* — Alan B Waits
(74) *Attorney, Agent, or Firm* — Cantor Colburn LLP

(57) ABSTRACT

A load bearing assembly comprises: a lug body; an outer race disposed within and supported by the lug body; an inner race disposed within and supported by the outer race; and a relief slot defined between the adjacent surfaces of the outer race and the lug body, wherein the relief slot is formed in the surface of the outer race.

12 Claims, 3 Drawing Sheets

(56) References Cited

U.S. PATENT DOCUMENTS

| | | | | |
|---|---|---|---|---|
| 1,664,879 A * | 4/1928 | Flintermann | F16C 27/02 | 384/303 |
| 2,304,595 A * | 12/1942 | Prentice | F16C 11/0614 | 191/64 |
| 2,322,004 A * | 6/1943 | Fast | F16C 27/02 | 384/125 |
| 2,710,236 A * | 6/1955 | Love | F16C 25/02 | 384/272 |
| 3,110,526 A * | 11/1963 | Sternlicht | F16C 27/02 | 384/222 |
| 3,980,352 A * | 9/1976 | Carlson | F16C 17/10 | 285/261 |
| 4,055,369 A * | 10/1977 | Lynn | F16C 11/0614 | 277/361 |
| 4,248,486 A | 2/1981 | Bradley, Jr. | | |
| 4,337,559 A * | 7/1982 | Rangel | B23P 15/003 | 29/898.044 |
| 4,636,106 A * | 1/1987 | Waisbrod | F16B 7/10 | 403/221 |
| 5,052,824 A | 10/1991 | Van Wyk | | |
| 6,129,455 A * | 10/2000 | Galante | B21K 25/00 | 29/898.062 |
| 7,478,952 B2 * | 1/2009 | Faust | F16C 27/04 | 384/535 |
| 8,100,587 B2 * | 1/2012 | Morton | F16C 25/08 | 384/569 |
| 8,337,090 B2 * | 12/2012 | Herborth | F01D 25/164 | 384/215 |
| 8,876,390 B2 * | 11/2014 | McNeil | F16C 33/12 | 384/206 |
| 2004/0057643 A1 * | 3/2004 | Blanchard | F16C 11/045 | 384/276 |
| 2007/0223849 A1 * | 9/2007 | Tschopp | F16C 11/0614 | 384/192 |
| 2011/0026862 A1 | 2/2011 | Bjoerkgard et al. | | |
| 2011/0129178 A1 * | 6/2011 | Shitsukawa | B60B 27/0005 | 384/589 |
| 2014/0077644 A1 * | 3/2014 | Onishi | H02K 5/161 | 310/90 |
| 2015/0198204 A1 * | 7/2015 | Abrudan | B23P 15/003 | 384/210 |
| 2015/0292561 A1 | 10/2015 | McNeil et al. | | |
| 2016/0290391 A1 * | 10/2016 | Hill | F16C 17/12 | |

\* cited by examiner

RELIEF SLOT FOR A LOAD BEARING ASSEMBLY

This application claims priority to European Patent Application No. 16173763.0 filed Jun. 9, 2016, the entire contents of which is incorporated herein by reference.

BACKGROUND

The present disclosure relates to a load bearing assembly. Particularly, it relates to a fretting relief slot for the load bearing assembly, the relief slot defined between adjacent surfaces of an outer race and a lug body of a load bearing assembly.

Spherical bearings within a rod or lug body are typically used to bear loads, and can be used for example to bear high loads in aerospace applications. Such arrangements often experience high frequency vibrations and reversals of loads in both the axial and radial directions of the spherical bearing, and hence they suffer from fretting as a consequence. Fretting is a general physical phenomenon that can occur between closely fitted components—e.g. between the spherical bearing outer race and the lug body—when relative motion causes corrosion damage, for example at the asperities of the contacting surfaces. Importantly, fretting promotes the onset of metal fatigue and can generate minute cracks and micro-fractures in the contact surfaces between the lug body and the outer diameter of the spherical bearing. The propagation of these cracks as a consequence of the fretting can eventually cause the lug body to break, resulting in catastrophic failure of the load bearing assembly.

Some load assemblies include substances between the spherical bearing outer race and the lug body to prevent or delay the onset of fretting fatigue and to mitigate the risk of catastrophic failure. Typically dry lubricants are used, for example: silver, molybdenum, graphite paste, and/or zinc nickel. However, the effects of these lubricants are limited and can be inconsistent due to their process dependent applications.

As part of the assembly process of such load bearing assemblies, the spherical bearing outer race lip is swaged onto the lug body. However, the process of swaging the spherical bearing outer race lip on to the lug body can stress the lug body itself, causing physical damage and further contributing to the possibility of catastrophic failure of the load bearing assembly.

As a consequence of fretting, the assembly can also experience alignment issues, which then exacerbate fatigue of the assembly by concentrating forces in unexpected regions, which in turn exacerbates fretting, yet further contributing to the possibility of catastrophic failure of the load bearing assembly.

SUMMARY

According to a first aspect of the present disclosure there is provided a load bearing assembly comprising: a lug body; an outer race disposed within and supported by the lug body; an inner race disposed within and supported by the outer race; and a relief slot defined between the adjacent surfaces of the outer race and the lug body; wherein the relief slot is formed in the surface of the outer race.

The relief slot may be formed only in the surface of the outer race. That is, the relief slot may be formed such that the clearance it provides between the adjacent surfaces of the outer race and the lug body is entirely provided by the depth of the slot defined in the outer race. Therefore, the lug body may not include a contributing portion to the relief slot, and may be shaped only to accommodate the outer race. Thus, the lug body may not require additional machining to form the relief slot. Hence, the lug body may be devoid of regions in which forces and stress might concentrate. A bore may be provided in the lug body for enclosing the outer race. This bore may be devoid of regions in which forces and stress might concentrate. It may be devoid of discontinuities, and may consist of gradual curves. For example, the bore may have a circular cross-section, and therefore be devoid of regions in which forces and stress might concentrate. The bore may have an internal surface which is entirely smooth, and/or may be continuously curved.

The relief slot may be defined in the surface of the outer race circumferentially perpendicular to the primary load bearing region of the surface, or a primary load path of the assembly. That is, the relief slot may be defined approximately perpendicularly (about the circumference) to the primary load bearing region. The shape of the lug body may define an axis along which loads are primarily borne—a primary load path—such that the arc of the circumference of the outer race through which the axis passes and hence through which such loads are substantially perpendicular, may be the primary load bearing region of the surface of the outer race. The relief slot may therefore be defined in an arc of the outer surface of the outer race at approximately 90 degrees (about the circumference) to the primary load bearing region i.e. where the surface of the outer race is substantially parallel to the primary load path of the assembly.

Failures of load bearing assemblies often occur at discontinuities in the components since forces cannot be spread evenly through such a region and are hence concentrated, causing fatigue of the component. When the fretting relief slot is defined on an arc of the circumference of the outer race that does not bear substantial loads, concentration of forces at e.g. the edges of the relief slot can be reduced.

The relief slot may be filled with a flexible adhesive such as Loctite and/or may be filled with a flexible sealant. The flexible adhesive may help retain the outer race within the lug body, while providing sufficient movement within the assembly. The relief slot may not be filled with a flexible adhesive, and may instead be empty.

The bearing may be retained in the lug body by swaging the outer race over the lug, preferably on both sides of the outer race. The prevention of rotation of the outer race from the swaging can be improved if the lug body includes a recess that receives a swaged element of the outer race at one or more points on the circumference of the outer race. The outer race may comprise a tab or key which has been swaged into a recess defined in the lug body. Once the outer race has been inserted into the lug body, it may be securely retained within the lug body by deforming the tabs into recesses defined in the lug body. The outer race may comprise two tabs, one at each axial end of the outer race and circumferentially opposed (i.e. at opposing points on the circumference). The outer race may comprise a plurality of tabs, for example, a total of four tabs, two at each axial end, each two being circumferentially opposed. The lug body may comprise recesses at positions corresponding to the tabs of the outer race. The outer race will hence be secured against axial and/or rotational movement within the lug body. There may be a lip on the opposite side of the outer race to the tabs, with the lip swaged into abutment with the lug body, preferably over the full circumference of the outer race.

The tab(s) may be circumferentially proximate the primary load bearing region of the surface of the outer race, or the primary load path of the assembly. That is, the tab(s) may be located on the circumference of the outer race near to the primary load bearing surface of the outer race, such that primary loads do not apply shear forces to the tab(s). Fatigue in the tabs may therefore be reduced.

The relief slot may be defined in the surface of the outer race over an arc of up to 90 degrees, for example 45 to 90 degrees. The angular extent of the relief slot may be chosen according to the use of the load bearing assembly and the magnitude of the loads expected. For example, lower loads may allow the relief slot to extend for a greater arc length than for higher loads, since less of the surface of the outer race is required to satisfactorily bear the loads. The relief slot may extend over an arc as set out above, and may extend over an arc of about 80 degrees in one example.

The relief slot may be defined in the surface of the outer race to a depth of up to 0.5 millimetres, for example a depth of between 0.1 and 0.5 millimetres, and in one example has a depth of about 0.25 millimetres. The depth of the relief slot may be substantially constant along its arc. The edges of the relief slot may be gradual inclines out to the outermost surface of the outer race.

The load bearing assembly may comprise a second relief slot on an opposite side of the outer race. That is, the relief slot may be a first relief slot and a second relief slot may be included on the side of the outer race that is circumferentially opposite (i.e. opposite on the circumference) to the first relief slot. The second relief slot may be as described above in relation to the first relief slot.

The inner race and outer race together may constitute a spherical bearing and hence they may have suitable spherical bearing surfaces. The outer race may have an outer surface of generally cylindrical shape that is housed with a generally cylindrical recess in the lug body. The spherical bearing may include other components beside the inner race and outer race, for example a dry liner or lubricant disposed on the outer surface of the inner race, between the adjacent surfaces of the inner race and outer race.

According to a second aspect of the disclosure there is provided a method of manufacturing a load bearing assembly comprising: a lug body; an outer race disposed within and supported by the lug body; and an inner race disposed within and supported by the outer race; the method comprising: providing a relief slot formed in the outer race between the adjacent surfaces of the outer race and the lug body.

The relief slot may be as described above in relation to the first aspect of the disclosure. The method may further comprise filling the relief slot with a flexible adhesive, such as Loctite, or any other suitable filler. The method may comprise swaging a tab of the outer race into a recess defined in the lug body. The method may include inserting the outer race into a bore of the lug body 130, wherein the bore is devoid of regions in which forces and stress concentrate. The bore may have a circular cross section.

BRIEF DESCRIPTION OF THE DRAWINGS

An exemplary embodiment of the present disclosure will now be described by way of example only and with reference to the accompanying drawings in which.

DETAILED DESCRIPTION

Figure 1:
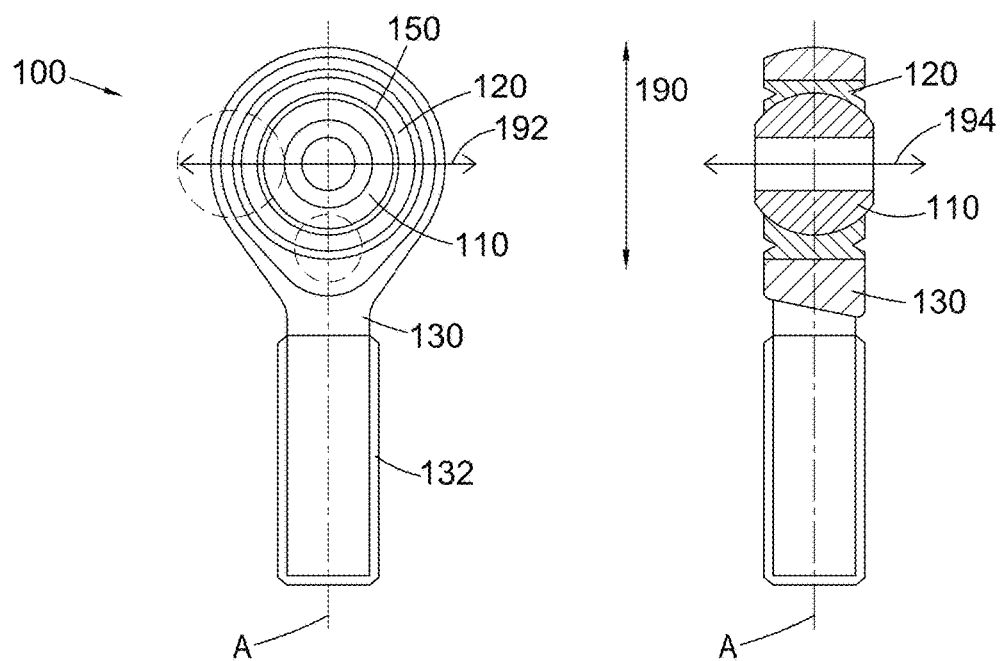
FIG. 1 shows a load bearing assembly.

FIG. 1 shows an exemplary load bearing assembly 100 comprising a spherical bearing comprising an inner race 110 and an outer race 120, and a lug body 130. A liner 150 may be disposed between the inner race 110 and the outer race 120 to facilitate relative movement therebetween.

The inner race 110 is disposed rotatably within the outer race 120, and the outer race 120 is disposed securely within the lug body 130. The inner race 110 is therefore mounted within the lug body 130 by the outer race 120. The outer race 120 is fixed with respect to the lug body 130, and the inner race 110 is moveable with respect to both the outer race 120 and the lug body 130.

The lug body 130 may comprise a connection means 132 (for example a threaded portion) to connect the lug body 130 to a load. The lug body 130 defines an axis A along which the load may be directed, e.g. in the direction of the arrow 190. This is the primary load path through the lug body 130. The load bearing assembly may also bear load in the direction indicated by arrow 192. The load borne in the direction of arrow 192 may typically be less than the load borne in the direction of arrow 190. The load may also be directed along arrow 194.

The direction of the load may be along any of the arrows 190, 192, 194, or any combination of those directions. It may also change directions, particularly reversing direction, regularly and frequently. Such changing of the load leads to fretting and component fatigue as described earlier.

Figure 2:
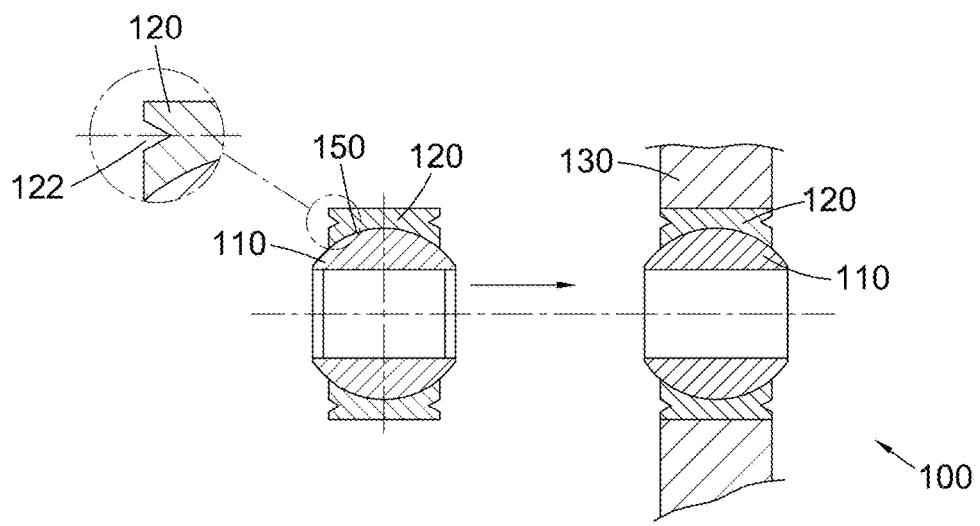
FIG. 2 shows an exploded view of a load bearing assembly.

FIG. 2 shows an exploded view of the load bearing assembly 100, with a magnified view of the edge of the outer race 120. The spherical bearing comprising the inner race 110 and the outer race 120 is inserted into a bore within the lug body 130. The outer race 120 is then swaged to secure it within the lug body 130. The swaging process forms indent 122 in the outer race 120.

Figure 3:
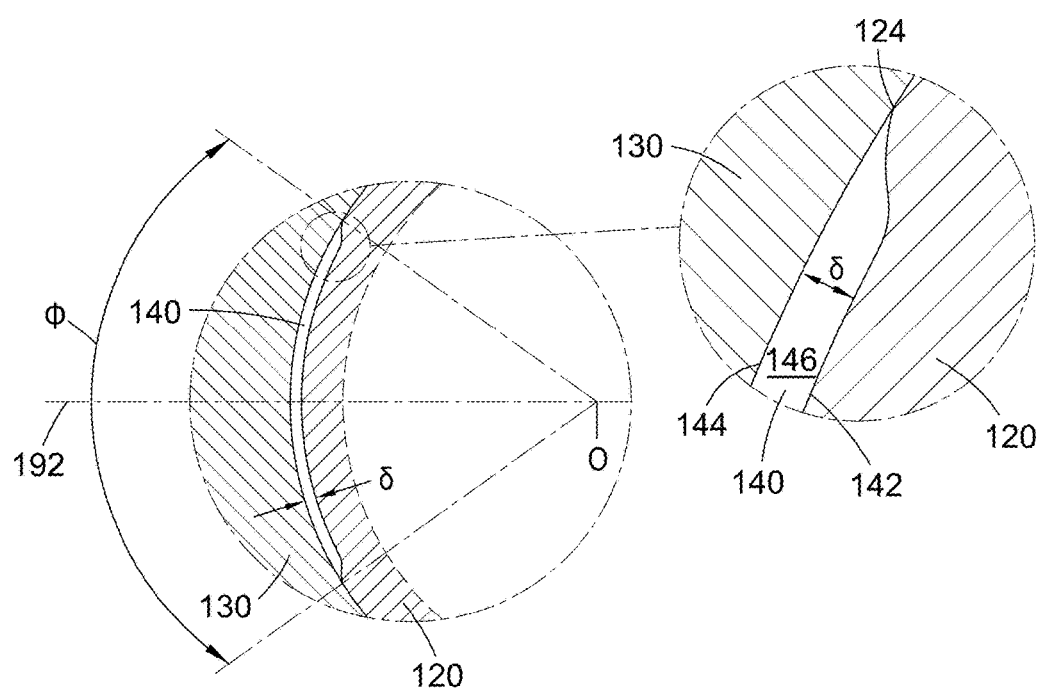
FIG. 3 shows a section view of a relief slot in a magnification of a portion of a load bearing assembly.

FIG. 3 shows a magnification of the large, dashed, leftmost circle of FIG. 1. It also shows a magnification of the indicated region near the top of the relief slot 140. The lug body 130 and the outer race 120 are visible in FIG. 3. Relief slot 140 is formed in the surface of the outer race 120. The relief slot 140 is formed only in the surface of the outer race 120, and has an inner surface 142 and an outer surface 144. The inner surface 142 of the relief slot 140 is on the outer race 120, and the outer surface 144 of the relief slot 140 is on the lug body. Since the relief slot 140 is formed (e.g. cut or machined) into the outer race 120, the cross-section of the bore in the lug body 130 is circular. Hence concentrations of stress in discontinuities of the surface of the lug body 130 are avoided, and fretting fatigue of the lug body 130 is reduced substantially.

The relief slot 140 has a width 6, and hence is defined a depth δ in to the outer race 120. The outermost surface 124 of the outer race 120 (i.e. the surface contacting the lug body 130) has the same centre of curvature O as that of the inner surface 142 of the relief slot 140. However, the relief slot 140 has a smaller radius of curvature than that of the outermost surface 124 of the outer race 120. Hence, the relief slot 140 has a constant depth δ across substantially its entire arc. Alternatively, the relief slot 140 may have a varying depth along its length.

The relief slot 140 is formed on an arc of Φ degrees and extends about the circumference of the outer race 120, symmetrically about the horizontal axis 192 (shown in FIG. 3). The angle Φ may be chosen depending on how the load bearing assembly is to be used. The angle Φ may be up to 90 degrees, for example about 80 degrees.

At the ends of the relief slot 140, the inner surface 142 gradually rises towards the outer surface 144 to become the outermost surface 124 of the outer race 120. The gradual gradient helps prevent stress concentrations within the outer race 120, thereby reducing fretting fatigue.

The relief slot 140 may have a width (in the direction of the arrow 194 in FIG. 1) of substantially all of the outer race 120, or of a portion of the outer race 120.

A flexible adhesive 146 is disposed within the relief slot 140, and serves to secure the outer race (and therefore also the inner race 110) within the lug body 130. An example of a suitable flexible adhesive is. Loctite, but other suitable compositions exist, such as sealant compounds.

As will be apparent from consideration of FIGS. 1 and 3 together, the relief slot 140 is defined in the outer race 130 at a position most distant from the axis A, perpendicular to the primary load path. Hence, the relief slot 140 is defined at a region which serves a lesser load bearing capacity than the regions through which the axis A passes. The primary load path passes though the surfaces at the top and bottom (relative to FIG. 1) of the outer race 120 and lug body 130.

Figure 4:
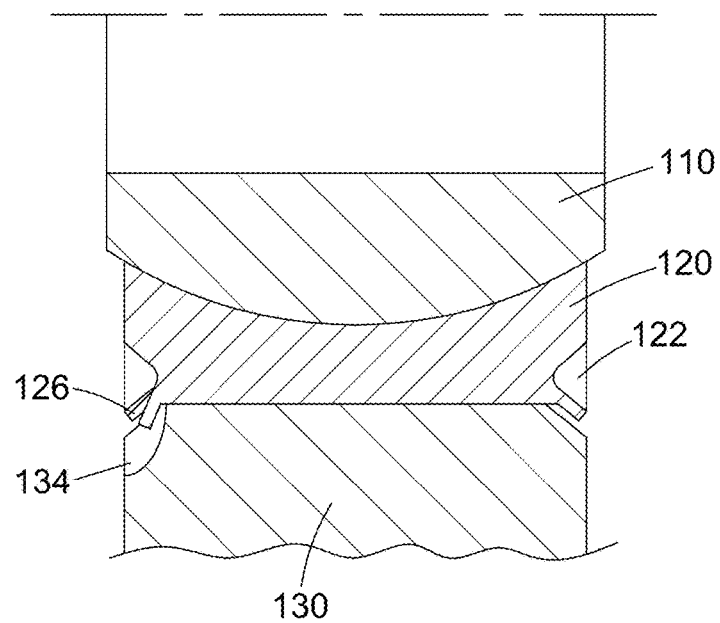
FIG. 4 shows a section view of portion of a load bearing assembly.
Figure 5:
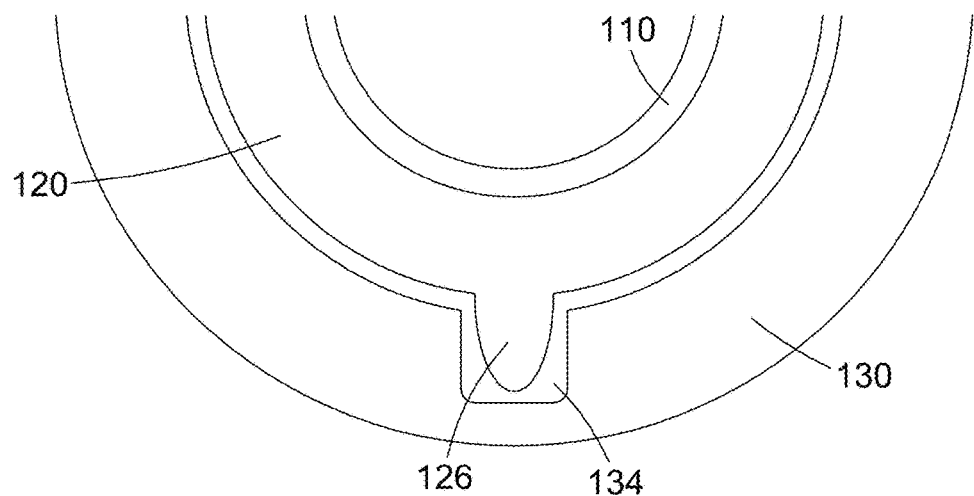
FIG. 5 shows the load bearing assembly of FIG. 5 from another direction.

FIG. 4 shows a perpendicular cross-section through the region of the assembly indicated by the smaller, dashed circle in FIG. 1. A tab 126 (not shown in FIG. 1) is formed on the outer race 120, and is deformed into a recess 134 defined in the lug body 130. FIG. 5 shows the same arrangement from the same perspective as FIG. 1. The tab 126 of the outer race 120 therefore locks the orientation of the outer race 120 relative to the lug body 130. The tab 126 is located in line with the axis A and the primary load path 190, opposite to the applied tensile load along the primary load path 190. Consequently, the primary loads through the assembly do not apply shear forces to the tab 126. A corresponding tab 126 is formed at the opposite side of the outer race 126, symmetrically to the tab 126 depicted in FIGS. 4 and 5. Any suitable number of tabs 126 may be used, though having only two per face of the assembly benefits from the lack of shear forces through the tabs 126 from the primary load path.

Although only one relief slot 140 has been depicted, the load bearing assembly comprises a second similar relief slot 140 on the opposite side of the outer race 120. The provision of the relief slots 140 as described herein provides fretting fatigue relief to the spherical bearing outer race 120. Moreover, it may substantially reduce the probability of catastrophic failure of the lug body 130, since the lug body 130 may have a circular bore which distributes loads more evenly than one with discontinuities defined in its surface. Further, even if the load bearing assembly fails as a consequence of fretting fatigue of the spherical bearing, it will not be a catastrophic failure as the failed spherical bearing can be retained within the lug body 130. Therefore, the assembly can continue to function (albeit at a reduced capacity) until maintenance can be carried out. Finally, rotation of the outer race 120 within the lug body 130 can be prevented, either by filling the relief slots with a flexible retaining substance or by physically deforming the tabs 126 on the outer lip of the outer race 120 into the recesses 134 on the lug body 130. This will allow the position of the relief slot 140 to remain as built.

The assembly and method described herein and shown in the drawings provide a load bearing assembly which reduces the possibility of a catastrophic failure caused by fretting. While the apparatus and methods herein have been shown and described with reference to an exemplary system, those skilled in the art will appreciate that changes and/or modifications may be made thereto without departing from the scope of the present disclosure as defined by the appended claims.

The invention claimed is:

1. A load bearing assembly comprising:
   a lug body defining an axis and a primary load path along the axis;
   an outer race disposed within and supported by the lug body;
   an inner race disposed within and supported by the outer race; and
   a relief slot defined between the adjacent surfaces of the outer race and the lug body, wherein the outer race comprises a tab which has been swaged into a recess defined in the lug body;
   wherein the tab is located on the circumference of the outer race in line with the axis and the primary load path so that loads through the assembly along the primary load path do not apply shear forces to the tab.

2. A load bearing assembly as claimed in claim 1, wherein the lug body comprises a bore for housing the outer race, wherein the bore is devoid of regions in which forces and stress concentrate.

3. A load bearing assembly as claims in claim 2, wherein the bore has a circular cross-section.

4. A load bearing assembly as claimed in claim 1, wherein the relief slot is defined in the surface of the outer race circumferentially perpendicular to the primary load bearing region of the surface.

5. A load bearing assembly as claimed in claim 1, wherein the relief slot is filled with a flexible adhesive and/or sealant.

6. A load bearing assembly as claimed in claim 1, wherein the relief slot is defined in the surface of the outer race over an arc in the range 45-90 degrees.

7. A load bearing assembly as claimed in claim 1, wherein the relief slot is defined in the surface of the outer race to a depth of 0.1-0.5 millimetres.

8. A load bearing assembly as claimed in claim 1, comprising a second relief slot on an opposite side of the outer race.

9. A method of manufacturing a load bearing assembly including a lug body defining an axis and a primary load path along the axis, an outer race disposed within and supported by the lug body, and an inner race disposed within and supported by the outer race; the method comprising:
   providing a relief slot formed in the outer race between the adjacent surfaces of the outer race and the lug body wherein the outer race comprises a tab which has been swaged into a recess defined in the lug body and is located on the circumference of the outer race in line with the axis and the primary load path so that loads through the assembly along the primary load path do not apply shear forces to the tab.

10. A method as claimed in claim 9, comprising filling the relief slot with a flexible adhesive or sealant.

11. A method as claimed in claim 9, comprising inserting the outer race into a bore of the lug body, wherein the bore is devoid of regions in which forces and stress concentrate.

12. A method as claimed in claim 11, wherein the bore has a circular cross section.

\* \* \* \* \*